May 1, 1951 G. G. HAVENS 2,551,537
LINKAGE FOR ARTIFICIAL LEGS
Filed Sept. 10, 1947 2 Sheets-Sheet 2
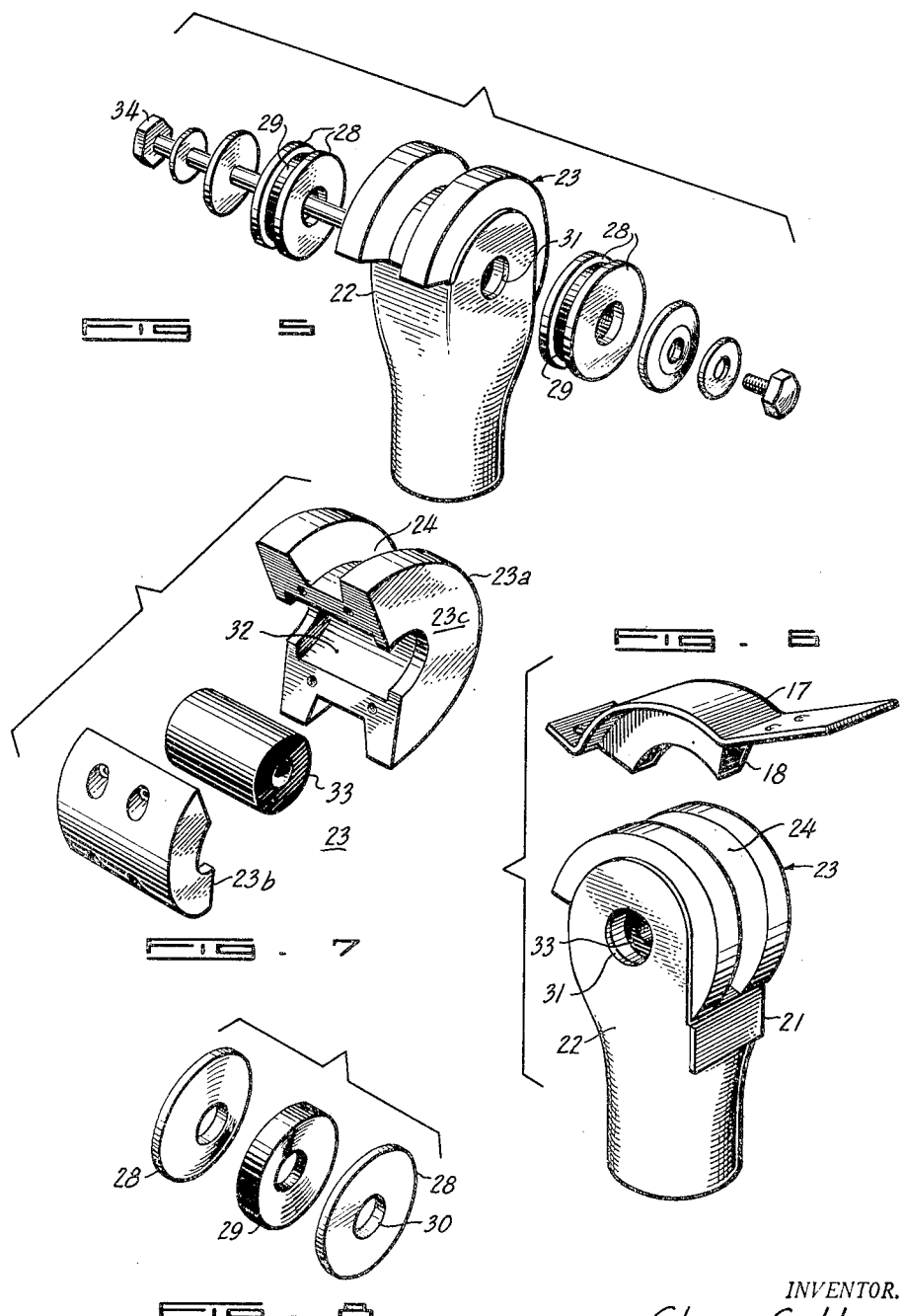
INVENTOR.
Glenn G. Havens
BY Roy C. Hackley
ATTORNEY Patented May 1, 1951

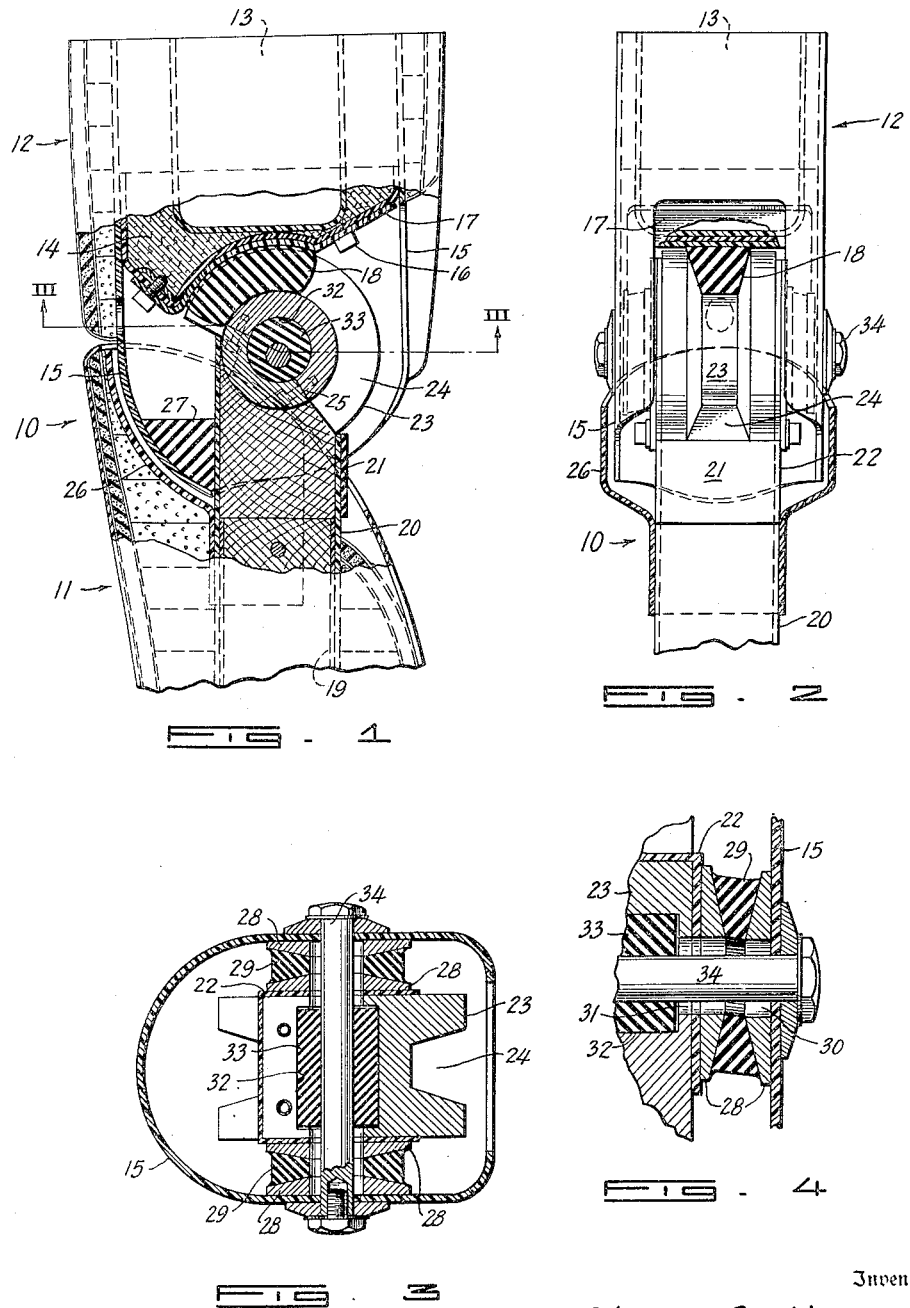

2,551,537

UNITED STATES PATENT OFFICE 2,551,537

LINKAGE FOR ARTIFICIAL LEGS

Glenn G. Havens, San Diego, Calif., assignor to Consolidated Vultee Aircraft Corporation, San Diego, Calif., a corporation of Delaware Application September 10, 1947, Serial No. 773,257

3 Claims. (Cl. 3—2)

This invention relates to improvements in artifical legs and more particularly to a knee joint for such legs.

It is an object of the present invention to provide a knee joint for an artificial leg which embodies resilient means adapted to actuate the leg without the use of any other means of actuation such as conventional body straps or elaborate mechanism embodied within the leg itself.

Another object of the present invention is the provision of a knee joint having embodied therein shock absorption means adapted to prevent the transmission of shock loads through the knee joint to the stump of the wearer.

Other objects and advantages of the present invention will be made apparent by a consulation of the appended specification and the accompanying drawing, in which:

Figure 1 is a vertical sectional view of a knee joint constructed in accordance with the present invention;

Figure 2 is a vertical sectional view of the knee joint;

Figure 3 is a horizontal sectional view taken along line III—III of Figure 1;

Figure 4 is a vertical sectional view showing a detail of the actuating and shock absorption means as they appear when a longitudinal load is imposed upon the knee joint;

Figure 5 is an exploded view, and in perspective, of the means for connecting the shank and thigh;

Figure 6 is a perspective view of the two elements comprising the locking means;

Figure 7 is an exploded perspective view of a detail of the locking means; and

Figure 8 is an exploded perspective view of one of the shock absorption means.

Having particular reference now to the drawings the numeral 10 indicates generally an artificial leg which comprises a shank portion 11 and a thigh portion 12 operatively interconnected for relative movement through the intermediary of linkage means to be hereinafter described. The particular construction of the shank portion 11 and the thigh portion 12 does not constitute a part of the subject-matter of the present invention and therefore no detailed description of the form or composition of these parts is herein made. For a detailed disclosure of the structure of the shank portion reference should be made to my Patent No. 2,464,391, which issued March 15, 1949.

Incorporated in the thigh section 12 is a stump socket 13 which is supported in a bed of fibrous material 14 contained within a shell portion 15 which forms a part of the thigh section 12.

Attached within shell 15 of thigh section 12 intermediate of its inner surfaces by means of fasteners 16 is an arcuate bearing plate 17 which has an arcuate, V-shaped, resilient element 18 depending therefrom to serve a purpose to be described.

A central, tubular bearing element 19 projects upward from the shank portion 11 and has mounted upon its upper end a tubular member 20 which has integrally formed thereupon a flat-sided cylinder 22. Opposite walls of the flat-sided cylinder 22 are cut away, as best illustrated in Figures 1, 5, and 6, in order to accommodate a spool device 23, which is adapted to be securely maintained in position at the upper end of tubular member 20 by being bonded to interior wall surfaces of the flat-sided cylinder 22. The spool device 23 comprises two main body portions 23a and 23b which cooperate to house a rubber bushing 33, as will be hereinafter further described. The two parts 23a and 23b are maintained in assembled relationship by four bolts or screws 25. Centrally formed in the peripheral surface of spool body portion 23a is an arcuate V-groove 24 which divides the body portion 23a into two sectors of the general configuration as shown in Figure 5 and having flat wall surfaces 23c. The arcuate V-groove 24 is adapted to receive and cooperate with V-shaped element 18 in a manner to be described to serve as a braking or holding assembly for the artificial leg.

A rounded skirt or shield 26 is mounted on the forward face of tubular member 20 and is adapted to cooperate with the lowermost portion of outer shell 15 of thigh section 12 to conceal the mechanism of the knee joint when the knee joint is in the closed position. Secured to the lowermost end of shell 15 and within the interior thereof is a buffer 27 which is adapted to impinge on the forward surface of tubular element 20 and to absorb some of the shock when the knee joint is swung into the closed position. A buffer 21 is also mounted on the rear of tubular member 20 to absorb the shock when the knee joint opens into the fully flexed position.

Shank portion 11 and thigh portion 12 are joined together through the intermediary of a pair of resilient, deformable link or connecting elements disposed on either side of the spool 23 and the flat-sided cylinder 22 which contains spool 23; and which connecting elements each comprise a pair of cylindrical, opposed frusto-conical mounting or bearing plates 28, one of which is mounted with its flat side upon and secured to a flat side of cylinder 22 and the other of which is secured with its flat side to the interior wall of thigh shell 15.

Interposed between mounting plates 28 are energy storing means which comprise annular discs of rubber 29 having generally frusto-concave side walls to receive the frusto-conical projecting portions of bearing plates 28, and which rubber means 29 act to secure the plates together and serve to actuate the leg by withdrawing the shank upward when the weight of the wearer is removed from the foot of the leg as will be later described in detail. Connecting members, similar to the above, comprising a pair of mounting plates and an interposed annular rubber disk have been disclosed and are described in complete detail in my Patent No. 2,450,728 granted October 5, 1948. Aligned openings 30 provide a passage through assembled plates 28 and intermediate disc 29, which passage is adapted to communicate with aligned openings 31 formed in the flat sides or walls of cylinder 22 and of spool 23, which spool 23, it is noted, is positioned on cylinder 22 transverse of the longitudinal axis of the cylinder. The openings 31 provide entrance to an enlarged cylindrical chamber 32 formed within and defined by the interior wall surfaces of the spool body portions 23a and 23b. Within chamber 32 there is housed a cylindrical bushing 33 formed of rubber or similar material and substantially the same size as the cylindrical chamber 32, which bushing is adapted to act as a shock absorbing element for the knee joint of the present invention.

A through-bolt 34 extends through the rubber bushing and is inserted through the walls of exterior shell 15 and passes through the openings 30 and 31 formed in mounting plates 28, discs 29 and cylinder 22 and spool 23. These openings are larger in diameter than the through-bolt and permit the shifting of the through-bolt within encasing rubber bushing 23 and in the direction of the longitudinal axis of shank portion 11.

When the wearer of the leg initiates his stride, he swings his thigh forward and causes the shank 11 to swing forward against the restraining force of resilient discs 29 which tend to keep the knee joint in the fixed position. When the knee joint is straightened and the weight of the wearer imposed thereupon the shock loads are carried from the spool 23 into the bushing 33 by through-bolt 34. The greater portion of the load is thus absorbed by the compression of bushing 33 before it is communicated by the through-bolt 34 to the thigh section and onto the stump of the wearer. This shock absorbing feature of the knee joint results in greater comfort for the wearer of the leg because the wearer's stump is isolated from the shock. The deflection of the discs 29 and bushing 33 when the weight of the wearer is imposed thereupon is shown very clearly in Figure 4.

When the bushing 33 and discs 29 are thus deflected the shank and thigh sections of the leg are longitudinally shifted towards each other and the through-bolt 34 is transversely moved off-center in the bushing 33 as shown in Figure 1. The longitudinal shifting of the shank and thigh towards each other permits the V-shaped element 18 to fit into the V-groove 24 of the spool 23. This action frictionally holds the knee joint and prevents it from collapsing when the weight of the wearer is on the leg.

With the V-shaped arcuate element 18 disposed in the V-groove 24 and the weight of the wearer acting on the artificial leg 10 a force will be applied to element 18, which being made of rubber or a similar material having resilient or elastic characteristics, is compressed somewhat to be made to fit tightly within V-groove 24. The V-shaped element 18 and the spool 23 with its peripheral V-groove 24 thus cooperate to effect a frictional braking means for the artificial leg 10 to hold the shank 11 in proper relative position to the thigh 12.

The action of discs 29 will now be described in greater detail. With the weight of the wearer upon the leg the tubular column 19 is forced upwards and carries the associated flat-sided cylinder 22 upwards with it. This upward movement of column 19 is permitted by the deflection of the connection between the thigh and shank since the frusto-conical members 28 mounted on the side of flat-sided cylinder 22 will be driven upward while the weight of the wearer will carry the opposed frusto-conical members 28 affixed to the interior of shell 15 downwardly, as is clearly shown in Figure 4. The resilient discs 29 will thus be placed in shear and as stated above the thigh section 12 and shank section 11 will move longitudinally and toward each other until the V-shaped element 18 is forced into the V-shaped groove 24 in spool 23. Thus spool 23 serves as a means to hold the leg in its extended position and the knee joint cannot be broken until the weight of the wearer is removed therefrom. The disposing of the V-shaped element 18 into V-shaped groove 24 prevents the imposition of a greater load upon the resilient discs 29 than they are designed to bear, for the mating of element 18 into groove 24 limits the extent of longitudinal movement between the shank and thigh section.

When the weight of the wearer is removed from the leg the bushing 33 returns to its unstressed position and draws the V-groove 24 away from the V-shaped element 18. When the frictional hold on the leg is thus released the discs 29 return to their unstressed position and lift the shank from the ground preparing the leg for the next step of the wearer. Upon lifting of the foot from the ground the resilient discs 29 return to their unstressed position, and shank 11 moves away from thigh 12 withdrawing V-shaped elements 18 out of contact with the defining walls of V-shaped groove 24 to thus release the frictional holding force applied to the knee joint. The resilient discs 29 returning to their original unloaded position carry the shank 11 backward until it assumes a normally bent position and raises the foot of the leg off the ground. Groove 24, as is illustrated, extends about the perimeter of spool 23, so that spool 23 can move because free passage is provided the V-shaped element 18 depending into groove 24. When the wearer enters that part of his stride wherein he is ready to impose his weight upon the artificial leg he swings the leg forward on his stump. The forward impetus imparted to the shank 11 causes it to straighten under thigh section 12, the weight of the wearer will then cause V-shaped element 18 to move into its mating groove 24 and frictionally hold the shank 11 in extended position.

There has thus been disclosed a knee joint which has embodied therein coacting braking, actuating and shock absorbing means and which can be manufactured at a very reasonable cost.

The present embodiment has been utilized for the purpose of disclosing the principle of operation of the invention and it is obvious to those skilled in the art that changes could be made in the details thereof which would still fall within the scope of the appended claims.

What I claim is:

1. A linkage for joining upper and lower portions of an artificial leg one to the other for pivotal and longitudinal movement of one portion relative to the other comprising a spool secured to the upper end of the lower leg portion and fitting into the lower end of said upper leg portion, said spool having a chamber therein, shock absorption means formed of resilient material and substantially equal in dimension to said chamber closely housed therein, a through-bolt carried by said upper leg portion, extending longitudinally through said cylindrical shock absorption means and adapted to move transversely within said shock absorption means to compress it upon longitudinal movement of said leg portions relative to one another, a depending element secured to the lower end of said upper leg portion, and a groove formed in said spool complementary in size and shape to the size and shape of said depending element for receiving said depending element, said shock absorption means being compressed by said through-bolt when moved transversely upon the application of the weight of the wearer to the leg, and said depending element being movable upon transverse movement of said through-bolt, from a normally disengaged position and into said groove for frictional engagement with the walls thereof to restrain said leg portions against relative movement.

2. In an artificial leg comprising an upper portion and a lower portion, linkage means operatively connecting the one to the other and permitting the pivotal movement of one relative to the other and longitudinal movement of these portions toward and away from one another, said linkage means comprising a spool secured to the upper end of said lower leg portion and fitting into the lower end of said upper leg portion, said spool having a chamber therein, shock absorption means formed of resilient material and substantially equal in dimension to said chamber housed therein, a through-bolt carried by said upper leg portion, extending longitudinally through the resilient shock absorption means and adapted to move transversely of said shock absorption means for compression thereof upon longitudinal movement of said leg portions relative to one another, a depending, arcuate, generally V-shaped, resilient element secured to the lower end of said upper portion and a generally V-shaped, arcuate groove formed in said spool for receiving said depending V-shaped element, said shock absorption means being compressed by said through-bolt on transverse movement thereof upon application of the weight of the wearer to the leg, and said V-shaped depending element being movable, upon transverse movement of said through-bolt, from a normally disengaged position and into said V-shaped groove for frictional engagement with the walls thereof to restrain said leg portions against relative movement.

3. In an artificial leg comprising a thigh portion and a shank portion, linkage means operatively connecting the one to the other and permitting the pivotal movement of said shank portion from a flexed position to an extended position, and longitudinal movement of these portions toward and away from one another, said linkage means comprising a bipartite spool secured to the upper end of said lower leg portion and fitting into the lower end of said upper leg portion, energy storing means secured to said thigh portion and attached to either side of said spool operative to hold said shank portion normally flexed relative to said thigh portion, said spool having a generally cylindrical chamber therein, generally cylindrical shock absorption means formed of rubber substantially equal in dimension to said chamber housed therein, a through-bolt carried by said thigh portion, extending longitudinally through resilient shock absorption means and adapted to move transversely of said shock absorption means for compression thereof upon longitudinal movement of said leg portions relative to one another, a depending, arcuate, generally V-shaped, resilient element secured to the lower end of said thigh portion and a V-shaped, arcuate groove formed in said spool for receiving said depending V-shaped element, said shock absorption means being compressed by said through-bolt on transverse movement thereof when said shank portion is extended in the act of walking and upon the application of the weight of the wearer to the leg, and said V-shaped depending element being movable, upon transverse movement of said through-bolt, from a normally disengaged position and into said V-shaped groove for frictional engagement with the walls thereof to restrain said leg portions against relative movement.

GLENN G. HAVENS.

REFERENCES CITED

The following references are of record in the file of this patent:

UNITED STATES PATENTS

| Number | Name | Date |
|---|---|---|
| 842,608 | Apgar | Jan. 29, 1907 |
| 1,552,869 | Nevin | Sept. 8, 1925 |
| 1,934,210 | Sargent | Nov. 7, 1933 |
| 1,975,040 | Groves | Sept. 25, 1934 |
| 1,991,796 | Desoutter | Feb. 19, 1935 |
| 2,357,893 | Harrington | Sept. 12, 1944 |
| 2,400,032 | Talbot | May 7, 1946 |
| 2,450,728 | Havens | Oct. 5, 1948 |

FOREIGN PATENTS

| Number | Country | Date |
|---|---|---|
| 336,757 | Great Britain | Oct. 23, 1930 |
| 452,186 | Germany | Nov. 7, 1927 |
| 602,992 | Germany | Sept. 20, 1934 |